US012653211B2

(12) United States Patent (10) Patent No.: US 12,653,211 B2
Nnanna et al. (45) Date of Patent: Jun. 16, 2026

---

(54) FILAMENTS MADE FROM MILK PROTEIN

(71) Applicant: BIG HEART PET, INC., Orrville, OH (US)

(72) Inventors: Ifendu A. Nnanna, Copley, OH (US); Anand Lakshmikanth, Copley, OH (US); Rajan K. Bista, Canal Fulton, OH (US)

(73) Assignee: BIG HEART PET, INC., Orrville, OH (US)

( * ) Notice: Subject to any disclaimer, the term of this patent is extended or adjusted under 35 U.S.C. 154(b) by 589 days.

(21) Appl. No.: 17/117,885

(22) Filed: Dec. 10, 2020

(65) Prior Publication Data

US 2021/0177009 A1 Jun. 17, 2021

Related U.S. Application Data

(60) Provisional application No. 62/947,378, filed on Dec. 12, 2019.

(51) Int. Cl.
A23K 20/147 (2016.01)
A23K 10/20 (2016.01)
(Continued)

(52) U.S. Cl.
CPC .......... A23K 20/147 (2016.05); A23K 20/163 (2016.05); A23K 40/25 (2016.05); A23K 50/40 (2016.05); *A23K 10/20* (2016.05)

(58) Field of Classification Search
CPC .... A23K 20/147; A23K 20/163; A23K 40/25; A23K 50/40; A23K 10/20; A23K 20/158; A23K 20/24
See application file for complete search history.

(56) References Cited

U.S. PATENT DOCUMENTS 2,266,672 A 12/1941 Wormell
4,563,360 A * 1/1986 Soucie ................... A23J 3/285
426/802
2013/0256942 A1 10/2013 Domaske

FOREIGN PATENT DOCUMENTS

WO WO-2015087647 A1 * 6/2015 ........... A01K 31/001

OTHER PUBLICATIONS

Jiangbing Xie, and You-Lo Hsieh. "Ultra-High Surface Fibrous Membranes from Electrospinning of Natural Proteins: Casein and Lipase Enzyme." Journal of materials science 38.10 (2003): 2125-2133. Web. (Year: 2003).*

(Continued)

*Primary Examiner* — Michele L Jacobson
*Assistant Examiner* — Carrie Glimm
(74) *Attorney, Agent, or Firm* — Michael A. Olshavsky; Timothy D. Semmelroth

(57) ABSTRACT

Edible casein-based flexible filaments with high tensile strength are disclosed. Filaments are formed by extruding compositions comprising about 30 to 60 wt. % milk proteins and about 40 to 65 wt. % of plasticizer. Casein sources include milk protein concentrate (MPC), calcium caseinate (CaC), or sodium caseinate (NaC). Plasticizers include water, glycerol, lactose and mixtures thereof. Ingredients to improve material properties may be used to form flexible filaments with higher tensile strength. Ingredients include gelatin or soy protein isolates (about 0.75-5 wt. %), xanthan gum (about 0.1-0.35 wt. %), and cellulose (about 0.5-4.95 wt. %). Filaments may be crosslinked by multivalent ions such as calcium to form networks to strengthen the filaments. Filaments of high tensile strength are provided with diameters ranging from about 80 to 2,000 microns. Filaments can be used as single filaments, strands of multiple (Continued)

filaments, or combinations of threads or braids, or shaped into configurations such as weaves, sheets, tubes, and rods.

16 Claims, 9 Drawing Sheets

(51) Int. Cl.

| | |
|---|---|
| *A23K 20/163* | (2016.01) |
| *A23K 40/25* | (2016.01) |
| *A23K 50/40* | (2016.01) |

(56) References Cited

OTHER PUBLICATIONS

Glico Nutrition (Pos-Ca™ <Food Ingredient>, 2020, https://web.archive.org/web/20201023053624/https://www.glico.com/nutrition/en/product/finechemical/posca/) (Year: 2020).*

Liu (Yaowei Lui et al. 3D printed milk protein food simulant: Improving the printing performance of milk protein concentration by incorporating whey protein isolate, Innovative Food Science & Emerging Technologies, vol. 49, 2018, pp. 116-126, https://doi.org/10.1016/j.ifset.2018.07.018.) (Year: 2018).*

John E. Kinsella & Charles V. Morr (1984) Milk proteins: Physicochemical and functional properties, Critical Reviews in Food Science & Nutrition, 21:3, 197-262; https://www.tandfonline.com/doi/abs/10.1080/10408398409527401.

P.F. Fox & A.L. Kelly (2004) The Caseins: Proteins-in-Food-Processing, University College, Cork, Ireland, pp. 29-71.

C.R. Southward Casein Products: Consumer & Applications Science Section, New Zealand Dairy Research Institute, pp. 1-13.

John F. Schmitz, Sevim Z. Erhan, Brajendra K. Sharma, Lawrence A. Johnson and Deland J. Myers (2008) Biobased Products from Soybeans, Chemistry, Production, Processing, and Utilization, pp. 539-612.

Adeline Boire, Antoine Bouchoux, Said Bouhallab, Anne-Laure Chapeau, Thomas Croguennec, Vincenza Ferraro, Valérie Lechevalier, Paul Menut, Stéphane Pézennec, Denis Renard, Véronique Santé-Lhoutellier, Karima Laleg, Valérie Micard, Alain Riaublanc, and Marc Anton (2017) Proteins for a Future: A Soft Matter Approach to Link Basic Knowledge and Innovative Applications, Innovative Food Science and Emerging Technologies, pp. 18-28; http://dx.doi.org/10.1016/j_ifset.2017.06.012.

Lodovico di Gioia and Stephane Guilbert (1999) Corn Protein-Based Thermoplastic Resins: Effect of Some Polar and Amphiphilic Plasticizers, J. Agric Food Chem 1999, vol. 47, No. 3, pp. 1254-1261.

Neha Chauahn, Nisha Arya and Suman Sodhi (2018) Fiber from Milk Byproducts—A New Dimension, International Journal of Current Microbiology and Applied Sciences, ISSN: 2319-7706 vol. 7 No. 04, pp. 1257-1264; https://doi.org/10.20546/ijcmas.2018.704.140.

V.M. Hernandez-Izquierdo & J.M. Krochta (2008) Thermoplastic Processing of Proteins for Film Formation—A Review, Journal of Food Science vol. 73, Nr. 2, R30-R39; https://onlinelibrary.wiley.com/doi/full/10.1111/i.1750-3841.2007.00636.x.

* cited by examiner

FILAMENT PRODUCTION FLOW

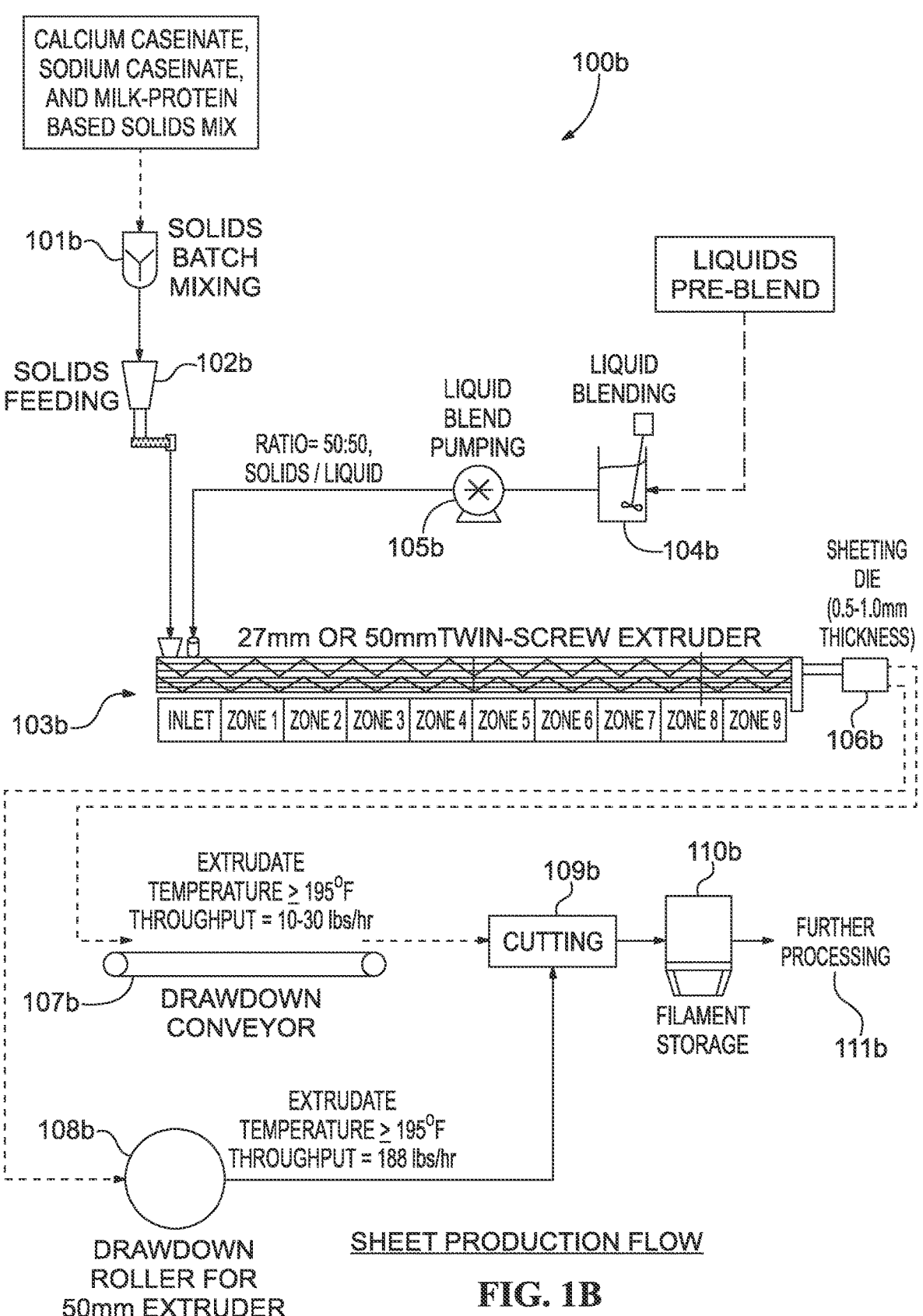

CALCIUM CASEINATE, SODIUM CASEINATE, AND MILK-PROTEIN BASED SOLIDS MIX

100b

101b — SOLIDS BATCH MIXING

LIQUIDS PRE-BLEND

SOLIDS FEEDING

102b

LIQUID BLEND PUMPING

LIQUID BLENDING

RATIO= 50:50, SOLIDS / LIQUID

105b

104b

SHEETING DIE (0.5-1.0mm THICKNESS)

27mm OR 50mmTWIN-SCREW EXTRUDER

103b

INLET | ZONE 1 | ZONE 2 | ZONE 3 | ZONE 4 | ZONE 5 | ZONE 6 | ZONE 7 | ZONE 8 | ZONE 9

106b

EXTRUDATE TEMPERATURE $\geq$ 195°F THROUGHPUT = 10-30 lbs/hr

109b

110b

CUTTING

FURTHER PROCESSING

FILAMENT STORAGE

111b

107b — DRAWDOWN CONVEYOR

108b

EXTRUDATE TEMPERATURE $\geq$ 195°F THROUGHPUT = 188 lbs/hr

DRAWDOWN ROLLER FOR 50mm EXTRUDER

SHEET PRODUCTION FLOW

FIG. 1B

FILAMENTS MADE FROM MILK PROTEIN

CROSS REFERENCE TO RELATED APPLICATION

This application claims the priority and benefit of U.S. Provisional Patent Application No. 62/947,378, filed Dec. 12, 2019, titled "Filaments Made From Milk Protein," the entirety of which is incorporated herein by reference.

BACKGROUND

Field of the Invention

The present invention relates generally to pet foods and pet treats. More specifically, the present invention involves compositions and methods for producing edible, flexible, protein-based fibers, filaments, and threads, which exhibit high tensile strength, for use with long lasting chew pet food products.

Description of the Related Art

Milk proteins can be divided into casein and whey protein. When milk protein is acidified, it curdles. Milk proteins that precipitate into a gel (the curd) at pH 4.6 and 20° Celsius are called caseins, while the milk proteins that remain water-soluble at pH 4.6 are known as whey proteins. Casein represents 80% of the total milk protein and consists of a family of phosphoproteins called $\alpha$-, $\beta$-, and $\kappa$-casein with molecular weights between 19 and 25 kDa. All caseins possess hydrophilic and hydrophobic segments and are phosphorylated, which means they exhibit calcium binding properties and are sensitive to pH. As such, addition of alkali, e.g., sodium hydroxide or calcium hydroxide, causes the precipitate curd to dissolve, forming soluble protein products known as caseinates. Caseinates can be spray or roll dried to produce caseinate powders, i.e., sodium caseinate (NaC) or calcium caseinate (CaC). By contrast, milk protein concentrate (MPC) is a concentrated complete protein powder containing from 40 to 90% milk protein including both casein and whey proteins in the same or similar ratio as milk.

Casein has been used in technical, non-food applications including use as adhesives for wood, paper coating, and leather finishing, in the production of plastics for buttons, buckles, etc., and in the production of synthetic fibers. Most applications for protein fibers or filaments in general are found in the textile industry. Such textile fibers are formed by a wet-spinning process that involves forcing solubilized proteins through a spinneret into an acid bath to coagulate the protein. Acid baths can consist of sulfuric acid, formaldehyde (to harden the fiber), and salt (to accelerate drying) solutions. Fibers are then collected on a reel and stretched to orient the fibers and to improve strength and elasticity of the fibers. These fibers are then immersed in formaldehyde to crosslink the protein and improve resistance to attack by water and dilute acids, and finally cut into desired lengths and dried. Milk protein fibers are known in the textile industry and are classified as regenerated protein fibers, filaments, or threads made from casein. Milk protein fibers can be formed by a similar wet-spinning process, which produces long strands that are stretched, heated, and chemically treated to increase strength and stability of the strands.

U.S. Pat. No. 2,266,672 discloses natural protein casein used to produce textiles. It describes treating threads formed by extruding a solution of casein into a coagulant, which is thereafter treated with a hardening agent comprising an aqueous solution of salt plus acid which brings the pH of the solution up to the isoelectric point of the casein. Excess solution is removed from the threads, which are heated under moist conditions (without allowing the moisture to evaporate), and then dried. United States Patent Application Publication No. 2013/0256942A1 discloses methods for producing milk protein fibers, which are then combined with a plasticizer under mechanical stress at temperatures ranging from room temperature to 140° Celsius. This combination is spun into fibers through a jet. Plasticizers such as aqueous polysaccharide solutions, alcohol, polyalcohol, and mixtures of these substances are described. Milk protein fibers processed in this manner for the textile industry use are further plasticized with heat and kneading during the melt spinning process. The drawn-out thread is then wound up or further processed, e.g., surface-treated, as desired.

The processing technology associated with the present application diverge from the prior approaches described above. Specifically, the prior approaches are intended for producing products having utility in the textile industry. However, these prior approaches do not address the specific needs of the pet food and pet treat industry. Therefore, a need still exists for protein filament compositions, as well as processing methods having specific application to the pet food and pet treat industry. These needs include consumable filaments and sheets made from edible, flexible, protein fibers, as well as efficient methods of manufacturing the compositions from milk protein, for use in pet food and treat products. The present invention addresses these unmet needs. Other advantages of the present invention arise because inventive compositions utilize ingredients in their native or raw form without the need for further extraction or isolation of the constituent protein, e.g., the compositions of the present invention contain caseinates, milk protein concentrates, and combinations thereof. Another advantage of the present invention is that no spinneret processing is required.

SUMMARY

An objective of the invention is to provide protein-based flexible filaments of suitable mechanical properties (as measured by tensile strength, elongation, and modulus of elasticity) and diameter for reinforcing long lasting chew pet food products and for other applications in the pet food and pet treats industry. Surprisingly, molecular structures associated with casein-based proteins exhibit the ability to form non-brittle, high tensile strength, flexible filaments. Preferable sources for casein-based proteins include milk protein concentrate (MPC), calcium caseinate (CaC), sodium caseinate (NaC), and combinations thereof.

An exemplary embodiment of the present invention includes a composition for forming a flexible and high tensile strength filament comprising from about 30 to 60 wt. % of a casein-based protein; and from about 40 to 65 wt. % of a plasticizer, wherein the formed filament has a diameter of from about 80 to 2,000 microns and exhibits tensile strength of from about 30 MPa to 80 MPa.

Another exemplary embodiment of the present invention includes a flexible and high tensile strength filament having a diameter of from about 80 to 2,000 microns and tensile strength of from about 30 MPa to 80 MPa which is made by forming a composition comprising from about 30 to 60 wt. % of a casein-based protein and from about 40 to 65 wt. % of a plasticizer; extruding the composition through a twin-screw extruder having a 2.3 mm filament die head wherein the extruder is operating at a melt pressure of from about 350 psi to about 600 psi and a temperature of from about 175° Fahrenheit to about 210° Fahrenheit; and depositing the extruded composition onto a conveyer wherein the conveyer is operating at from about 17.5 feet per minute to about 80 feet per minute and draws down the filament to a diameter of from about 80 microns to about 2,000 microns, to thereby form the flexible and high tensile strength filament.

Yet another exemplary embodiment of the present invention includes a flexible and high tensile strength filament having a diameter of from about 80 to 1,000 microns and tensile strength of from about 30 MPa to 80 MPa which is made by forming a composition comprising from about 30 to 60 wt. % of a casein-based protein and from about 40 to 65 wt. % of a plasticizer; extruding the composition through a twin-screw extruder having a 1.4 mm filament die head wherein the extruder is operating at a melt pressure of from about 100 psi to about 150 psi and a temperature of from about 150° Fahrenheit to about 265° Fahrenheit; and depositing the extruded composition onto a conveyer wherein the conveyer is operating at from about 17.5 feet per minute to about 80 feet per minute to drawdown the filament to a diameter of from about 80 microns to about 1,000 microns, to thereby form the flexible and high tensile strength filament.

Yet another exemplary embodiment of the present invention includes a method for forming a flexible and high tensile strength filament comprising the steps of forming a composition comprising from about 30 to 60 wt. % of a casein-based protein and from about 40 to 65 wt. % of a plasticizer; extruding the composition at a melt pressure of from about 100 psi to about 600 psi and a temperature of from about 150° Fahrenheit to about 265° Fahrenheit through a filament die head ranging in size from about 1.4 mm to about 2.3 mm; and depositing the extruded composition onto a conveyer operating at from about 17.5 feet per minute to about 80 feet per minute to drawdown the filament to a diameter of from about 80 microns to about 2,000 microns.

Yet a further exemplary embodiment of the present invention includes a method for forming a flexible and high tensile strength sheet comprising the steps of forming a composition comprising from about 30 to 60 wt. % of a casein-based protein and from about 40 to 65 wt. % of a plasticizer; extruding the composition at a melt pressure of from about 350 psi to about 600 psi and a temperature of from about 175° Fahrenheit to about 210° Fahrenheit through a 30-inch sheeting die having a 0.5 mm to 1.0 mm gap width to form a sheet; and depositing the extruded composition onto a conveyer operating at from about 17.5 feet per minute to about 80 feet per minute, or, alternatively, pressing the extruded composition with a drawdown roller, to reach a desired thickness.

BRIEF DESCRIPTION OF THE DRAWINGS

Additional aspects, features, and advantages of the invention, as to its structure, assembly, and use, will be understood and will become more readily apparent when the invention is considered in conjunction with the following description of illustrative embodiments and the accompanying drawings.

FIG. 1a illustrates a process equipment schematic showing a twin-screw extruder system for producing milk protein-based filaments, extruded through a filament die-head of 1.4 mm or 2.3 mm and drawn down using a conveyor, while FIG. 1b illustrates a schematic similar to FIG. 1a as modified for producing milk protein-based sheets with a twin-screw extruder system having a sheeting die head of 0.5-1.0 mm and a conveyor or roller to drawdown the sheets.

DETAILED DESCRIPTION

Figure 1A:
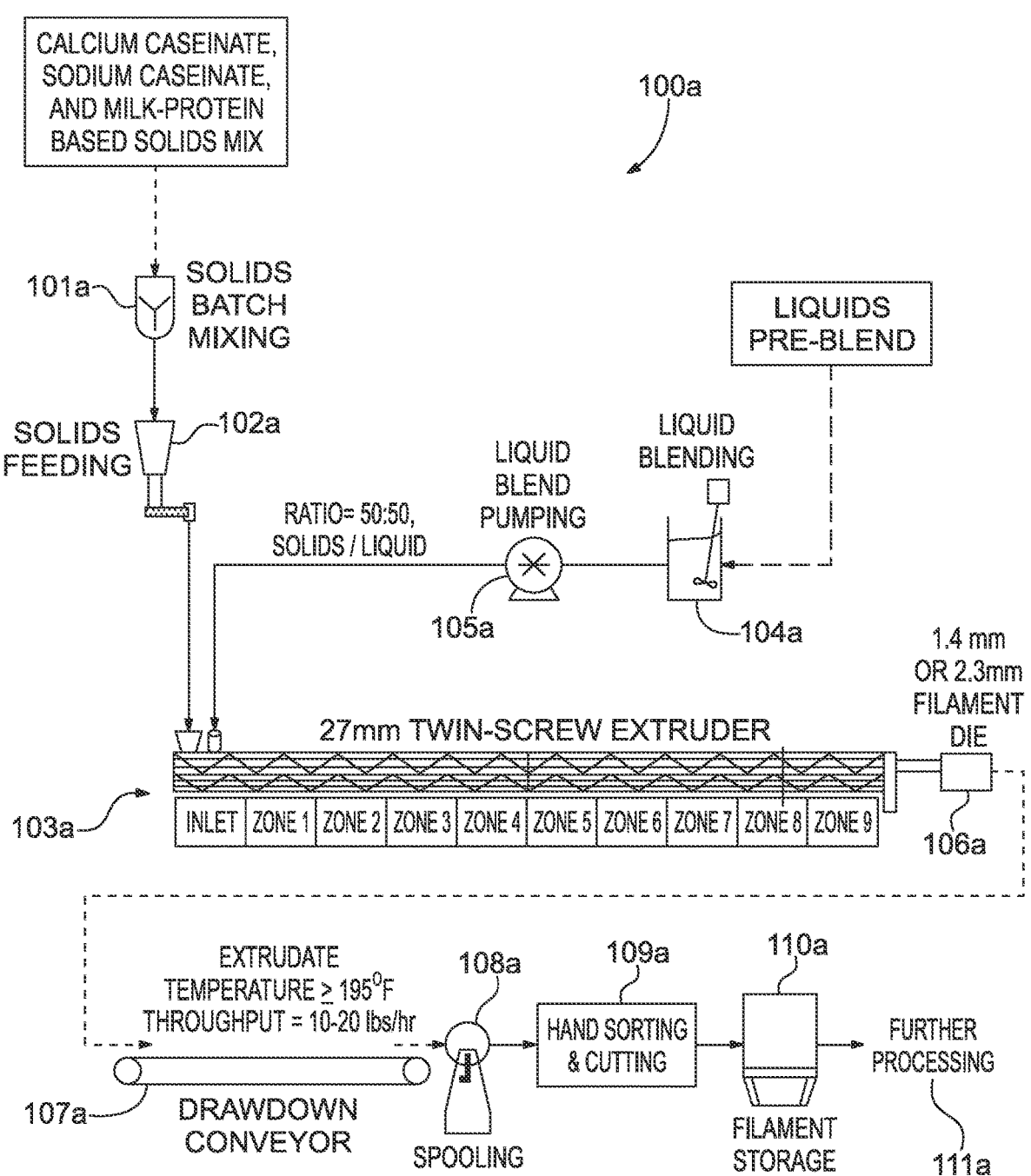

The present invention involves understanding how to manufacture and shape materials containing casein-based protein filaments using various processing technologies such as thermo-molding (thermoplastic processing), roller milling, and extrusion. The casein-based filaments can be formulated with milk protein concentrate (MPC), sodium caseinate (NaC), or calcium caseinate (CaC), either alone or in combination with other components including, for example, a plasticizer, and additional ingredients to enhance tensile strength. Whether any protein-based material can be processed using such techniques depends on the material's ability to transition from the glassy state to the rubbery and free-flow states. This is because, when a protein is heated above its glass transition temperature, the protein become soft and rubbery and can be shaped into a desired form. However, once cooled, the protein network becomes fixed, and the bulk material hardens into the imposed form. Such transitions may be enabled through use of plasticizers and use of appropriate processing conditions including temperature and dwell time in a mold, die, or roller.

The present invention provides protein-based flexible filaments with desirable mechanical properties, i.e., tensile strength, elongation, and modulus of elasticity, making the filaments suitable for use in reinforcing long lasting pet chew products. The terms "filament" or filaments", as used herein, mean an elongated particulate(s) that is at least 80 to at least 2,300 microns in diameter, and, in a non-limiting, exemplary embodiment at least 80 to 2,000 microns. Suitable protein-based materials for forming filaments include plant and animal proteins, preferably casein-based protein filaments. Optionally, filaments and constituent protein-based materials from which they are formed can also be cross-linked. The term "about" can be used to refer to a specific number disclosed, as well as plus or minus 5% of the disclosed number.

Casein-Based Proteins

It has been surprisingly discovered that milk proteins and their derivatives are suitable for this invention. More specifically, it has been found that milk proteins and their derivatives namely, milk protein concentrates (MPC), calcium caseinate (CaC), or sodium caseinate (NaC) when combined with preferred plasticizers and processed utilizing a twin-screw, self-wiping, corotating and intermeshing extruder under certain processing conditions form non-brittle, flexible filaments of unique molecular structures, which exhibit high tensile strength. A main advantage of such flexible filament compositions, as well as methods of processing the compositions, is that the extrudate forms filaments, which can be shaped further in various other configurations including threads, strands, and sheets that have a broad range of textures and tensile strengths.

Without intending to be bound by any theory of operability, it is believed that the low cysteine levels associated with casein (and milk proteins in general) means there is very little disulfide cross-linking occurring. As such, casein has an open random-coil structure and is not therefore susceptible to a denaturation process. This structural attribute enables charged, polar, and nonpolar amino acids to be distributed along the protein chain. Such a molecular arrangement creates chemical potential, and the related interactive forces produce filaments that are both cohesive and flexible. While all milk proteins are suitable for the various embodiments of the present invention, it is contemplated that other animal-based and vegetable-based proteins having similar properties as those described for milk proteins would also be suitable for the present invention.

More specifically, it is believed that milk protein concentrate (MPC) may be advantageous because it contains both casein and whey proteins in a similar ratio as that found in milk. Also, MPC contains intact casein micelles (in their natural state) which may add stability against application of physical force to bulk materials that contain MPC. Casein micelles are complex macromolecular assemblies made of four distinct caseins, namely, αS1, αS2, β, and κ-caseins, and 8% in mass of phosphate and calcium ions. Casein micelles with diameters ranging from 100 to 200 nm have a role in the processing of milk, cheese, and most dairy products. Also, MPC is typically made from skim milk, which has fat levels of less than 3 percent.

Plasticizers

In general, effective plasticizers enable the glass transition temperatures of polymers to be lowered and assist with facilitating polymer deformation during processing. Suitable plasticizers include water, glycerol, and lactose. Water is an effective plasticizer for biopolymer materials. Glycerol ($C_3H_8O_3$) is a low molecular weight, hydrophilic, water-soluble and protein miscible molecule that can easily insert itself within the 3-dimensional biopolymer network. Because of this, glycerol is also an effective plasticizer for biopolymer materials, and it is widely used with thermoplastic processing of proteins. Lactose is present in milk protein concentrate (MPC) at about 4 to 7 wt. %. While water, glycerol, and lactose, as well as compounds and derivatives therefrom, are suitable, it is contemplated that other molecules or compounds having similar properties to those described for water, glycerol, and lactose would also be suitable for the present invention. By way of non-limiting examples, other suitable plasticizers can include polyols such as, ethylene glycol, diethylene glycol, triethylene glycol, tetraethylene glycol and polyethylene glycol, propylene glycol, sorbitol, mannitol and xylitol; fatty acids; monosaccharides (glucose, mannose, fructose, sucrose); mono-, di- and oligosaccharides; ethanolamine; vegetable oils; lecithin; waxes; and amino acids. Preferably, plasticizers are present in the compositions of the present invention from about 40 to 65 wt. % in certain preferred ratios.

Crosslinkers and Additional Ingredients

Milk proteins and their derivatives can be crosslinked with divalent ions such as calcium, e.g., in the form of calcium chloride, to form a network structure and further strengthening and adding durability to the filaments. Preferably, casein-based protein filaments of the present invention can be crosslinked in this manner to form network structures having increased strength and durability. More preferably, sodium caseinate protein filaments can be cross-linked in this manner to form network structures having even more strength and durability. While divalent ions such as calcium are suitable, it is contemplated that other multivalent ions, e.g., divalent, trivalent, tetravalent, etc., having similar functionalities, properties, solubilities, etc., to those described for calcium would also be suitable for use with the present invention.

Milk proteins and their derivatives can also be mixed with one or more additional ingredients to improve material properties and form flexible filaments with even higher tensile strength. For example, milk proteins and their derivatives can be blended with other proteins such as gelatin or soy protein isolate (SPI), or mixed with polysaccharide such as cellulose, or mixed with a hydrocolloid such as xanthan gum. Without being bound by any theory of operability, it is believed that cellulose strengthens filaments but also expands filament diameter. Similarly, it is believed that xanthan gum increases the viscoelasticity of caseinates and, when combined with cellulose, can help to produce relatively thinner filaments. Therefore, preferably, gelatin, SPI, and combinations thereof may be present in the mixtures from about 0.75 to 5 wt. %; and preferably, xanthan gum may be present in the mixtures at from about 0.1 to 0.35 wt. %; and preferably, cellulose may be present in the mixtures at from about 0.5 to 4.95 wt. %.

While the additional ingredients listed above are suitable, it is contemplated that other animal or vegetable proteins, e.g., whey protein, wheat gluten, etc., and that other polysaccharides, e.g., starch, glycogen, chitin, etc., and that other natural or synthetic hydrocolloids and gelling agents, e.g., agar, alginate, carrageenan, gelatin, gellan gum, guar gum, locust bean gum, gum karaya, gum tragacanth, gum Arabic, and derivatives thereof, etc., having similar functionalities, properties, solubilities, etc., to those described for the additional ingredients listed above would also be suitable for use with the compositions of the present invention.

Additional Processing Considerations

Maintaining a proper solid-to-liquid ratio during filament processing is important for various reasons including, for example, to control extrudate stickiness. This is because the higher the solids in a present mix, the more the extrudate exhibits die swell. However, this must be balanced against the observation that higher solids in a mix also lowers surface friction, which equates to a lower drawdown. Still further, consideration must likewise be given to the observation that lower flow rates at the outer holes of the die means an increase in drawdown. Finally, the higher the solids present in the formulation, the higher the tensile strength exhibited by the resulting filaments. Because of the forgoing, certain solid-to-liquid ratios are preferred. Preferably, the solid-to-liquid ratio can range from about 55:45 to about 50:50 to about 45:55.

Figures and Examples

Referring specifically now to FIG. 1a, a process equipment schematic illustrates a twin-screw extruder system (100a) used for the extrusion of casein-based protein filaments operating at preferred processing conditions. Exemplary, non-limiting embodiments utilize a Leistritz ZSE 27HP or ZSE 50 mm MAXX twin-screw extruder. An exemplary filament composition comprising a casein-based protein and a plasticizer is produced by batch mixing a milk protein-based solids mix (101a) and feeding the solids mix (102a) into a twin screw extruder (103a), where the solids mix is combined with a liquid mixture, which is first blended (104a) and then pumped (105a) into the extruder (103a). The twin-screw extruder (103a) can have multiple zones, such as, 9 zones. The solids mix and liquid blend are extruded at a melt pressure of from about 100 psi to about 600 psi and a temperature of from about 150° Fahrenheit to about 265° Fahrenheit through an 8-hole 1.4 mm or a 5-hole 2.3 mm filament die head (106a). The extrudate is deposited onto a conveyer (107a) operating at a speed of from about 42 feet per minute to about 80 feet per minute. The extrudate, which is tacky to the touch, contacts the surface of a belt of the conveyor (107a) (which belt may be fabric or other suitable material) and the movement of the conveyor belt at the chosen conveyor operating speed causes the extrudate, which has an original cross-sectional diameter approximating the size of the filament die head (106a) (i.e., 1.4 mm or 2.3 mm) to be drawn down into a filament with a cross-sectional diameter of from about 80 microns to about 2,000 microns. The filament can be spooled (108a) for cutting and/or sorting (109a) for storage (110a) and later use in processing (111a) for forming pet food or chew products.

How thin the extrudate the drawn down will be, and, likewise, what will be the resulting cross-sectional diameter of a filament, can be largely influenced and achieved by selecting an appropriate operating speed for the conveyor (107a). Also, a drying unit can be used to air dry the drawn down extrudate under ambient conditions and, as a result, 80 microns to about 2,000 micron filaments are formed that are both flexible and have a high tensile strength ranging from about 30 MPa to 80 MPa.

Referring specifically now to FIG. 1b, a process equipment schematic illustrates a twin-screw extruder system used for extruding casein-based protein sheets (100b) operating at preferred processing conditions. Exemplary, non-limiting embodiments utilize a Leistritz ZSE 27HP or ZSE 50 mm MAXX twin-screw extruder. An exemplary filament composition comprising a casein-based protein and a plasticizer produced by batch mixing a milk protein-based solids mix (101b) and feeding the solids mix (102b) into a twin screw extruder (103b), where the solids mix is combined with a liquid mixture, which is first blended (104b) and then pumped (105b) into the extruder (103b). The twin-screw extruder (103b) can have multiple zones, such as, 9 zones. The solids mix and liquid blend is extruded at a melt pressure of from about 350 psi to about 600 psi and a temperature of from about 175° Fahrenheit to about 210° Fahrenheit through a 30-inch sheeting die head (106b) having a 0.5 mm to 1.0 mm gap width to form a sheet. The sheet is deposited onto a conveyer (107b) operating at a speed of from about 42 feet per minute to about 80 feet per minute. The sheet, which is tacky to the touch, contacts the surface of a belt of the conveyor (107b) (which belt may be fabric or other suitable material) and the movement of this conveyor belt at the chosen conveyor operating speed causes the sheet to be drawn down into a thickness of from about 500 microns to about 1,000 microns. Alternatively, the sheet, after exiting the sheeting die head (106b) may be drawn down by a roller (108b) to desired thickness. The sheet, after being drawn down by the conveyor (107b) or by the roller (108b), can be cut into desired length, size, and/or shape by a cutting operation (109b) before the cutting operation, and then stored (110b) for later use (111b) in processing for forming pet products.

Figure 2:
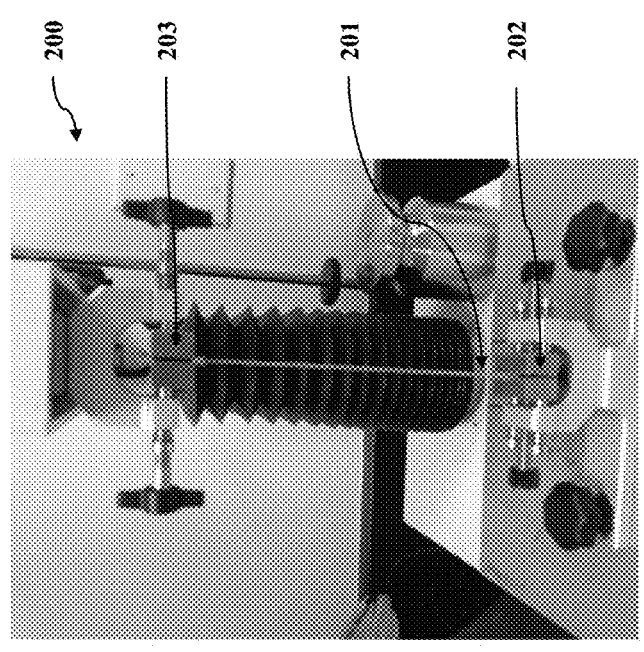
FIG. 2 illustrates a Texture Analyzer instrument used to measure the tensile strength of the compositions of the present invention with ASTM Standard Method D638-08.

Referring specifically now to FIG. 2, a Texture Analyzer instrument (Texture Technologies Corp.) (200) is shown and was used to measure the tensile strength of filaments, fibers, or strands of the present invention. A predefined length of exemplary flexible and high tensile strength filament (201) was prepared for tensile strength measurement by attaching the two separate ends of the filament (201) to the texture analyzer instrument (200). As shown in FIG. 2, attachment of the filament is achieved by means of a bottom clamp (202) and a top clamp (203).

Figure 3:
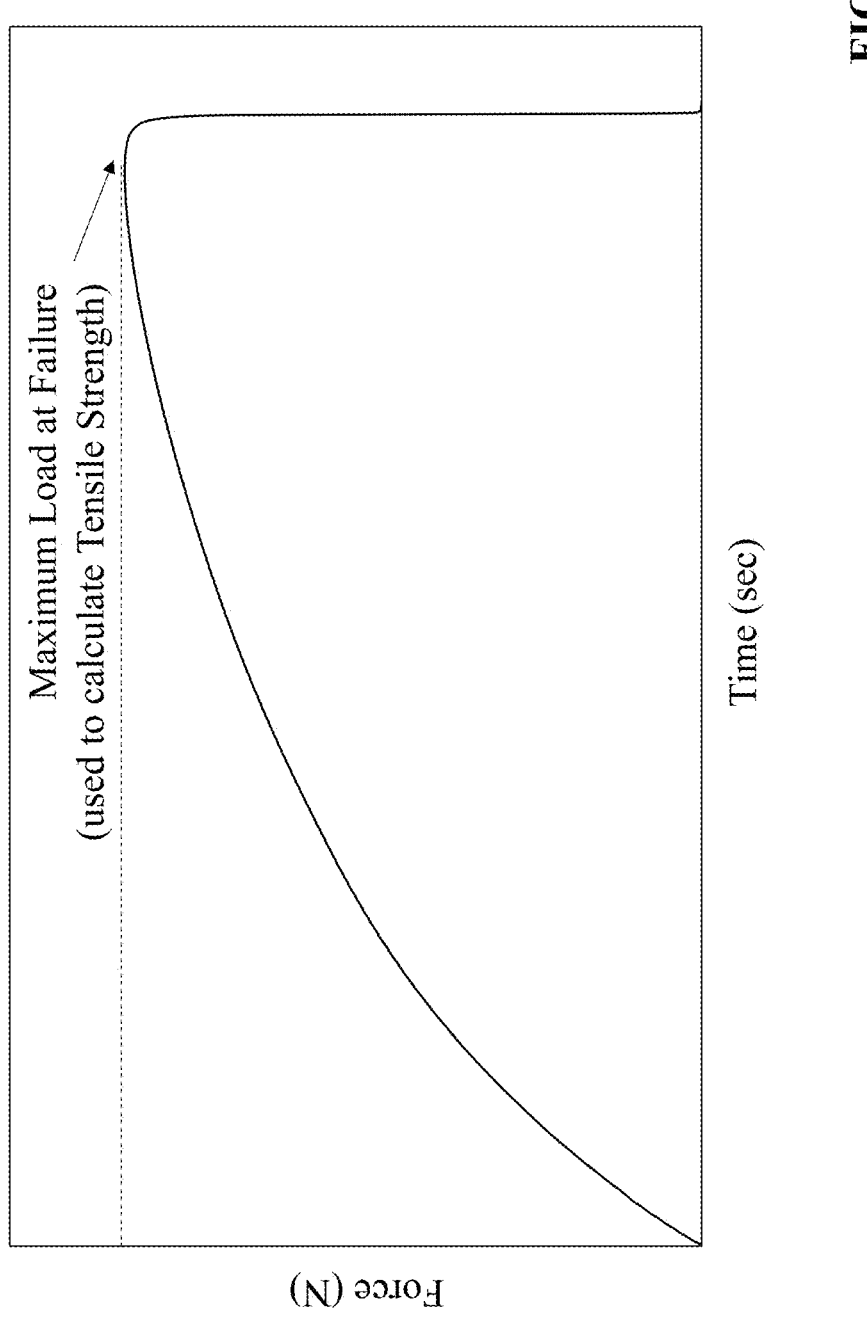
FIG. 3 illustrates a representative test profile of the tensile strength of filaments of the present invention by determining maximum load (N) at failure per area of filament.

Referring specifically now to FIG. 3, the graph generally illustrates a representative test profile for the tensile strength of casein-based filaments of the present invention. Tensile testing was used to calculate the maximum load (N) at failure per area of filament. For the purpose of the present invention, tensile strength measurements of exemplary filaments were conducted using ASTM Standard Method D638-08 in combination with the Texture Analyzer instrument (200) shown in FIG. 2.

Figure 4:
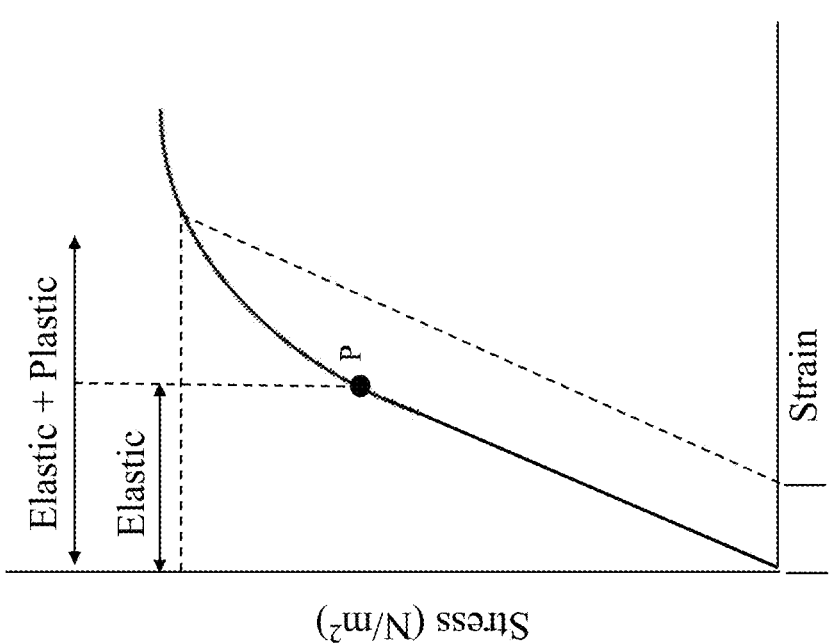
FIG. 4 illustrates, generally, the mechanical properties and characteristics of elasticity and plasticity of brittle and ductile products.

Referring specifically now to FIG. 4, the graph generally illustrates the principles of physics explaining certain mechanical properties and characteristics associated with brittle and ductile products. (See, e.g., W. Callister, Jr., *Materials Science and Engineering: An Introduction* Wiley (1994)). FIG. 4 shows the typical stress-strain behavior exhibited by materials as they undergo elastic and plastic deformations, which, can be used to calculate tensile strength, i.e., the load at failure, associated with a product.

Figure 5:
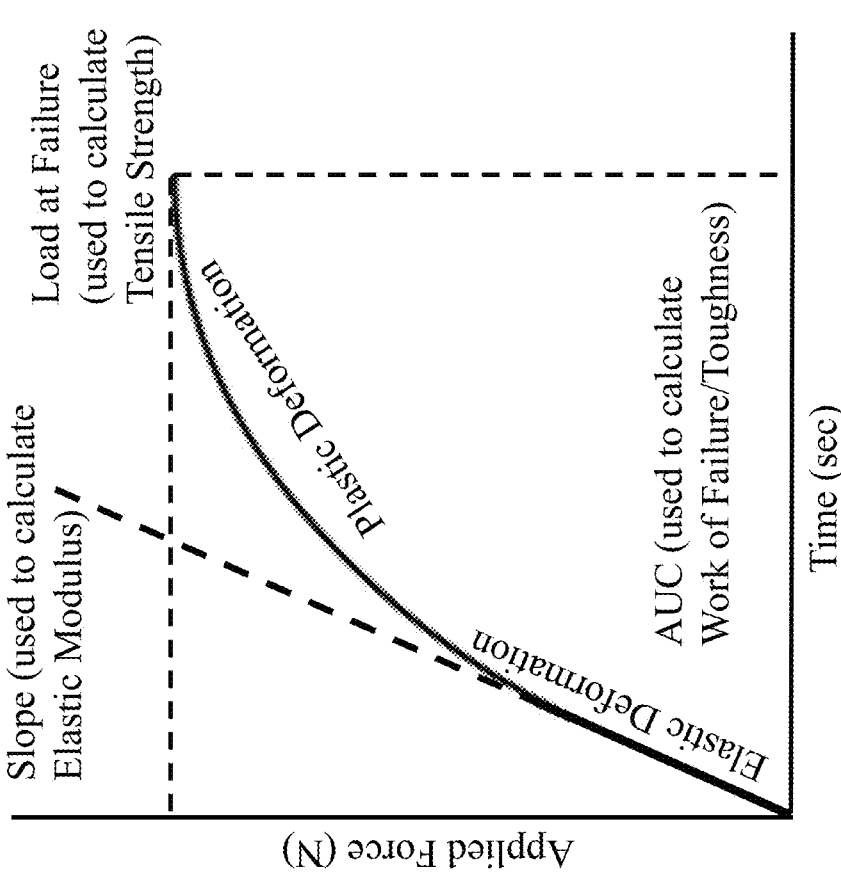
FIG. 5 illustrates, generally, the manner in which the mechanical properties and characteristics of brittle and ductile products are measured using applied force (N) over time to calculate the modulus of elasticity (slope of elastic deformation) and tensile strength (maximum load at failure per area).

Referring specifically now to FIG. 5, the graph generally illustrates the first principles of physics explaining how tensile strength of a filament is measured. (See, e.g., W. Callister, Jr., *Materials Science and Engineering: An Introduction Wiley* (1994)). FIG. 5 demonstrates the regions of elastic and plastic deformation associated with a material and how the work of failure can be calculated.

Figure 6:
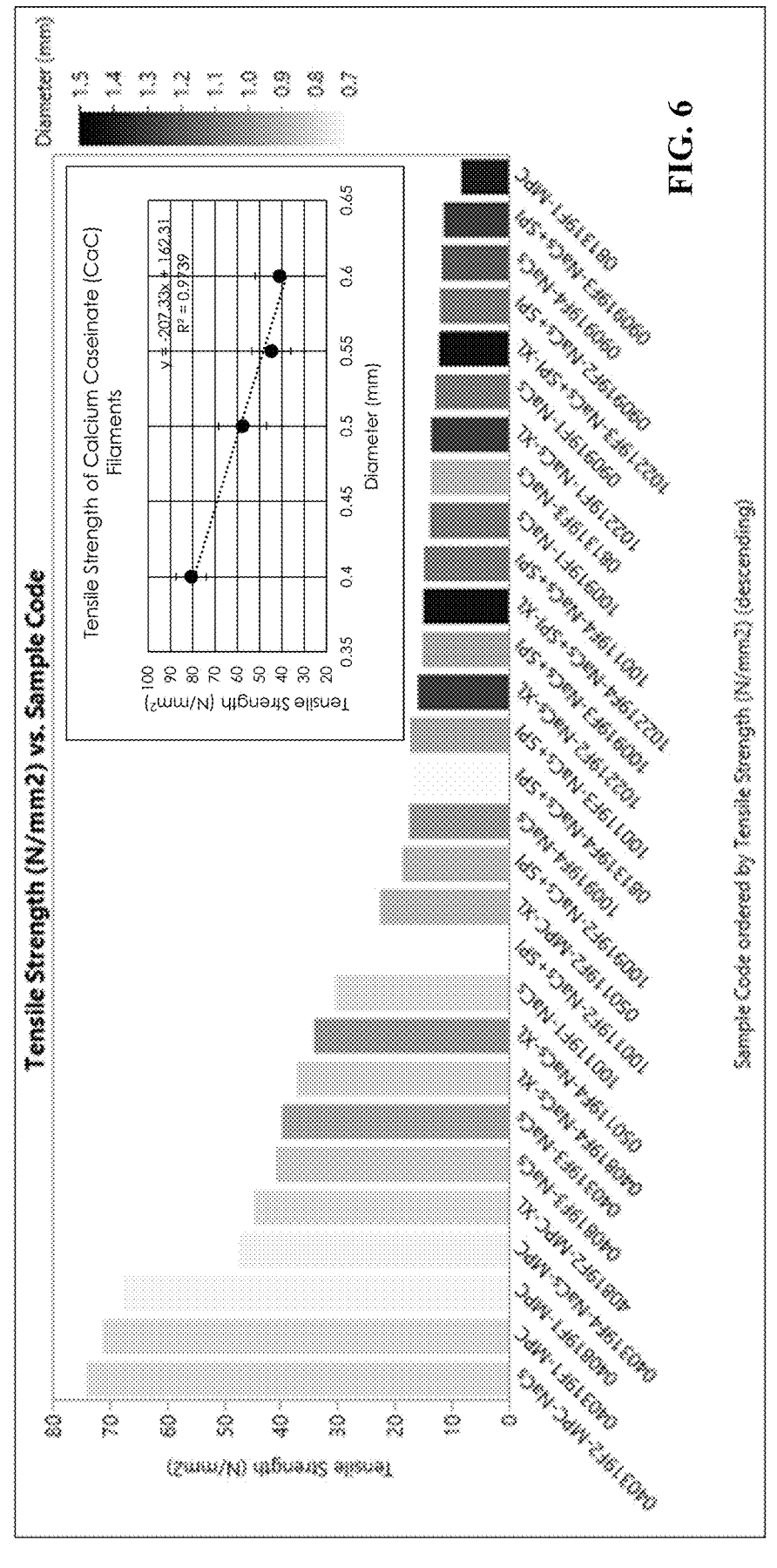
FIG. 6 is a graph illustrating the relationship of tensile strength ($N/mm^2$) to the diameter of various exemplary samples of casein-based filaments of the present invention including filaments formulated with milk protein concentrate (MPC), calcium caseinate (CaC), and sodium caseinate (NaC), either alone or in combination with soy protein isolate (SPI) and with or without protein crosslinking (XL) with calcium chloride.

Referring specifically now to FIG. 6, the graph illustrates the relationship between tensile strength and diameter for casein-based protein filaments of the present invention. FIG. 6 demonstrates that tensile strength is inversely proportional to the filament's cross-sectional diameter (i.e., as cross-sectional diameter of a filament decreases, the strength of the filament increases). An examination of FIG. 6 confirms that, as the cross-sectional diameter of an exemplary calcium caseinate-based filament decreases, the associated tensile strength for the filament increases. There are likely many different reasons for how this result is achieved. Without intending to be bound by any theory of operability, it is believed that upon drawdown of an exemplary filament composition extrudate, impurities in the filament composition are removed, the density of the extrudate, as well as the density of the resulting filament, increases, and polymer chains become more aligned and therefore able to undergo increased interchain interactions, all of which lead to overall increased tensile strength for the associated filament.

FIG. 6 (main graph) plots the data presented on Table A1.

TABLE A1

| Sample Code | Tensile Strength (N/mm2) | Diameter (mm) |
|---|---|---|
| 040319F1-MPC | 71.14 | 0.8 |
| 040319F2-MPC-NaCs | 74.08 | 0.8 |
| 040319F3-NaCs | 39.76 | 0.96 |
| 040319F4-NaCs-MPC | 47.42 | 0.74 |
| 040819F1-MPC | 67.67 | 0.73 |
| 40819F2-MPC-XL | 44.6 | 0.8 |
| 040819F3-NaCs | 40.78 | 0.84 |
| 040819F4-NaCs-XL | 37.05 | 0.82 |
| 050119F2-MPC-XL | 22.53 | 0.9 |
| 050119F4-NaCs-XL | 34.07 | 1 |
| 081319F1-MPC | 8.31 | 1.4 |
| 081319F3-NaCs | 13.71 | 0.9 |
| 081319F4-NaCs + SPI | 17.36 | 0.71 |
| 100919F1-NaCs | 13.84 | 1.1 |
| 100919F2-NaCs + SPI | 18.66 | 0.9 |
| 100919F3-NaCs + SPI | 15.07 | 0.95 |
| 100919F4-NaCs | 17.49 | 1 |
| 090919F1-NaCs | 12.86 | 1.1 |
| 090919F2-NaCs + SPI | 12.04 | 1.1 |
| 090919F3-NaCs + SPI | 11.39 | 1.3 |
| 090919F4-NaCs | 11.76 | 1.2 |
| 100119F1-NaCs | 30.26 | 0.8 |
| 100119F2-NaCs + SPI | 29.26 | 0.7 |
| 100119F3-NaCs + SPI | 17.34 | 0.95 |
| 100119F4-NaCs + SPI | 14.82 | 1.1 |
| 102219F1-NaCs-XL | 13.57 | 1.3 |
| 102219F2-NaCs-XL | 15.92 | 1.3 |
| 102219F3-NaCs + SPI-XL | 12.23 | 1.45 |
| 102219F4-NaCs + SPI-XL | 14.94 | 1.45 |

*As used throughout the application, the term "XL" refers to crosslinked protein, e.g., using calcium chloride as crosslinker.

FIG. 6 (inset graph) plots the data presented on Table A2.

TABLE A2

| Product ID | Diameter (mm) | Tensile Strength (N/mm2) | Tensile Strength Std. Dev. |
|---|---|---|---|
| CAC-F3 | 0.4 | 80.75 | 6.82 |
| CAC-F3 | 0.5 | 57.69 | 10.72 |
| CAC-F3 | 0.55 | 44.74 | 8.75 |
| CAC-F3 | 0.6 | 41.05 | 11.01 |

Figure 7:
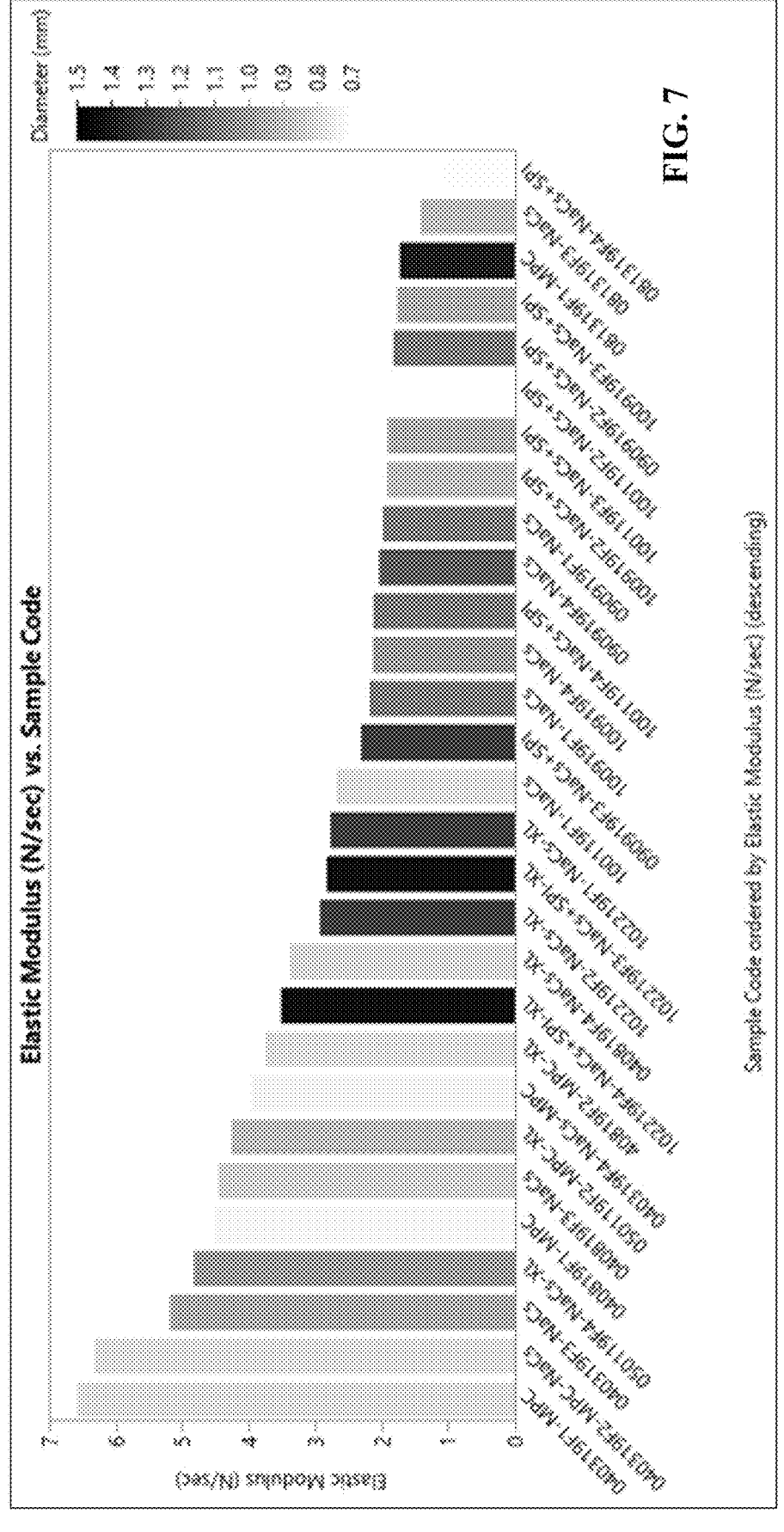
FIG. 7 is a graph illustrating the relationship of the modulus of elasticity (N/sec) to the diameter, i.e., stiffness, of various exemplary samples of casein-based filaments of the present invention including filaments formulated with milk protein concentrate (MPC), calcium caseinate (CaC), and sodium caseinate (NaC), either alone or in combination with soy protein isolate (SPI) and with or without protein crosslinking (XL) with calcium chloride.

Referring specifically now to FIG. 7, which shows the measured modulus of elasticity (N/sec) (Young's Modulus) of various filaments of the present invention, the relationship between elasticity and material stiffness is illustrated. Filaments made from formulations with a higher modulus of elasticity produce a stiff material. In contrast, filaments made from formulations with a lower modulus of elasticity produce durable, non-brittle, and easy to use filaments. The formulations tested comprise casein provided as milk protein concentrate (MPC), sodium caseinate (NaC), or MPC and NaC, either alone or in various combination with soy protein isolate (SPI) and with or without protein crosslinking (XL) using calcium chloride.

FIG. 7 plots the data presented in Table B.

TABLE B

| Sample Code | Elastic Modulus (N/sec) | Diameter (mm) |
|---|---|---|
| 040319F1-MPC | 6.58 | 0.8 |
| 040319F2-MPC-NaCs | 6.31 | 0.8 |
| 040319F3-NaCs | 5.19 | 0.96 |
| 040319F4-NaCs-MPC | 3.96 | 0.74 |
| 040819F1-MPC | 4.5 | 0.73 |
| 40819F2-MPC-XL | 3.75 | 0.8 |
| 040819F3-NaCs | 4.45 | 0.84 |
| 040819F4-NaCs-XL | 3.38 | 0.82 |
| 050119F2-MPC-XL | 4.26 | 0.9 |
| 050119F4-NaCs-XL | 4.83 | 1 |
| 081319F1-MPC | 1.72 | 1.4 |
| 081319F3-NaCs | 1.41 | 0.9 |
| 081319F4-NaCs + SPI | 1.06 | 0.71 |
| 100919F1-NaCs | 2.17 | 1.1 |
| 100919F2-NaCs + SPI | 1.92 | 0.9 |
| 100919F3-NaCs + SPI | 1.76 | 0.95 |
| 100919F4-NaCs | 2.13 | 1 |
| 090919F1-NaCs | 1.98 | 1.1 |
| 090919F2-NaCs + SPI | 1.82 | 1.1 |
| 090919F3-NaCs + SPI | 2.31 | 1.3 |
| 090919F4-NaCs | 2.03 | 1.2 |
| 100119F1-NaCs | 2.67 | 0.8 |
| 100119F2-NaCs + SPI | 1.83 | 0.7 |
| 100119F3-NaCs + SPI | 1.91 | 0.95 |
| 100119F4-NaCs + SPI | 2.12 | 1.1 |
| 102219F1-NaCs-XL | 2.77 | 1.3 |
| 102219F2-NaCs-XL | 2.92 | 1.3 |
| 102219F3-NaCs + SPI-XL | 2.82 | 1.45 |
| 102219F4-NaCs + SPI-XL | 3.5 | 1.45 |

Experimental Details—Analytical Methods

Tensile Strength Analysis: The tensile properties for filaments formed from the compositions of the present invention were tested according to ASTM Standard method D638-08 using a Texture Analyzer instrument (200). The performance of filaments was quantified in terms of tensile strength, which is defined as the ratio of maximum force (N) required to break the filament divided by the cross-sectional area of the filament. The analysis was conducted with a TA.XT Plus Texture Analyzer instrument (TA-96B, Texture Technologies) with a 5 kg load cell fitted with miniature grips (202, 203) operated at a trigger force of 5 g, test speed of 0.5 mm/second. The Texture Analyzer instrument (200) pulled (up to a distance of 100 mm) a 10 cm long piece of filament sample clamped between grips (202, 203) until the sample broke. The texture analyzer instrument (200) determined the maximum force required to break the filament expressed in unit Newton (N). This maximum force (N) divided by cross-sectional area of the filament (measured in $mm^2$) was expressed as tensile strength (N/$mm^2$) of the filament.

Surface Energy Analysis: Filament samples were analyzed for surface energy in water and diiodomethane (methylene iodide) as probe liquids and the Fowkes theory. The contact angles with these probe liquids were measured by the dynamic contact angle (Wilhelmy) method, on ~20 mm long filament pieces each dipped into the probe liquid to a depth of 10 mm while measuring the wetting force during dipping. Triplicate experiments were performed with each of the two probe liquids on each filament. Wetting force of liquid on the surface of the filament reflects contact angle of the liquid against the filament according to the following equation: Fw=cos(Θ) Lσ[where Fw=the Wilhelmy wetting force, Θ=contact angle, L=the wetting length (circumference) of the filament, and σ=the surface tension of the probe liquid].

EXPERIMENTAL METHODS

Example 1

Twenty-one milk protein formulas containing sodium caseinate (NaC), calcium caseinate (CaC), and gluten (GLU) as "base protein ingredients", alone or in combination with soy protein isolate (SPI) or gelatin (GEL), were screened by a twin-screen extrusion process of the present invention and evaluated for their suitability for producing filaments. Table 1 indicates the percentage by weight of the "base protein ingredients" alone or in combination with SPI or GEL. Suitable formulations for filament development based on processability, draw-down, and viscoelasticity on success was determined to be CaC alone or CaC in combination with GEL or SPI, with a maximum draw-down achieved at 500 μm. CaC filaments were less sticky and more resilient during drawdown. Table 1 shows the filament cross-sectional diameters and associated tensile strengths.

TABLE 1

| Sample Description | Diameter (mm) | Tensile Strength (N/mm$^2$) |
|---|---|---|
| CaC 35% | 0.40 | 80.75 |
| CaC/GEL 30.625/4.375 | 0.50 | 58.23 |
| CaC 35% | 0.50 | 57.69 |
| CaC/GEL 30.625/4.375 | 0.65 | 48.24 |
| CaC 35% | 0.55 | 44.74 |
| CaC/GEL 30.625/4.375 | 0.60 | 44.56 |
| CaC/SPI 26.25/8.75 | 0.50 | 41.28 |
| CaC 35% | 0.60 | 41.05 |
| NaC 35% | 0.30 | 32.25 |
| CaC/SPI 17.5/17.5 | 0.80 | 30.22 |
| CaC/SPI 26.25/8.75 | 0.70 | 29.85 |
| CaC/GEL 30.625/4.375 | 0.70 | 28.55 |
| NaC 35% | 0.65 | 27.99 |
| NaC 35% | 0.45 | 26.80 |
| NaC 35% | 0.50 | 21.77 |
| CaC/SPI 26.25/8.75 | 1.25 | 19.40 |
| NaC 35% | 0.40 | 17.46 |
| NaC/SPI 26.25/8.75 | 2.00 | 15.49 |
| NaC/SPI 26.25/8.75 | 1.60 | 10.58 |
| NaC/SPI 26.25/8.75 | 1.20 | 6.36 |
| GLU/SPI/GEL 22.75/8.75/3.5 | 1.20 | 2.92 |

This data shows various protein ingredients and the ability to develop exemplary filament structures associated with the present invention. The data reveals that, when the source of casein is calcium caseinate (CaC), small diameter (~300 microns) filaments having high tensile strength (80 N/mm$^2$) are produced.

Example 2

Milk protein formulas containing sodium caseinate (NaC) in combination with cellulose (0-3%) and/or xanthan gum (0-0.4%), which were used to enhance filament resistance and elasticity, were tested. Table 2 shows the diameter and tensile strength of filaments from this experiment. The F1-NaC 21618 formulation was the most processable of all the tested samples and produced consistent quality filaments in comparison to the other five formulations.

TABLE 2

| Sample Description | Sodium caseinate (%) | Cellulose (%) | Xanthan Gum (%) | Diameter (mm) | Tensile Strength (N/mm$^2$) |
|---|---|---|---|---|---|
| F1 - NaC21618 | 35 | 3.0 | 0.2 | 0.55 | 35.40 |
| F2 - NaC21618 | 35 | 1.5 | 0 | 1.42 | 28.51 |
| F3 - NaC21618 | 35 | 0 | 0.4 | 1.46 | 32.55 |
| F4 - NaC21618 | 35 | 3.0 | 0 | 1.93 | 28.47 |
| F5 - NaC21618 | 35 | 0 | 0.2 | 1.78 | 30.57 |
| F6 - NaC21618 | 35 | 1.5 | 0.4 | 1.38 | 28.43 |

Example 3

Milk protein formulas containing milk protein concentrate (MPC) alone or in combination with cellulose (0-3%) and/or xanthan gum (0-0.4%), which were used to enhance filament resistance and elasticity, were tested. Table 3 shows the diameter and tensile strength of filaments from this experiment. The LT-LLC 062018-F4 formulation produced consistent quality filaments in comparison to the other five formulations.

TABLE 3

| Sample Description | Milk Protein Concentrate (%) | Cellulose (%) | Xanthan Gum (%) | Diameter (mm) | Tensile Strength (N/mm$^2$) |
|---|---|---|---|---|---|
| F1 - MPC62018 | 37 | 3 | 0.2 | 0.94 | 28.94 |
| F2 - MPC62018 | 37 | 0 | 0.3 | 0.94 | 33.78 |
| F3 - MPC62018 | 37 | 3 | 0 | 0.88 | 31.77 |
| F4 - MPC62018 | 37 | 1.5 | 0.2 | 0.93 | 32.65 |
| F5 - MPC62018 | 37 | 1.5 | 0.3 | 1.00 | 31.19 |
| F6 - MPC62018 | 37 | 0 | 0 | 0.96 | 31.59 |

Example 4

Milk protein formulas containing sodium caseinate (NaC) in combination with soy protein isolate (SPI), cellulose (0-3%), and/or xanthan gum (0-0.5%), which were used to enhance filament resistance and elasticity, were tested. Table 4 shows the diameter and tensile strength of filaments from this experiment. The F4-NaC22118 formulation was the most processable of the tested formulations and produced consistent quality filaments in comparison to the other five formulations.

TABLE 4

| Sample Description | Sodium Caseinate (%) | SPI (%) | Cellulose (%) | Xanthan Gum (%) | Diameter (mm) | Tensile Strength (N/mm$^2$) |
|---|---|---|---|---|---|---|
| F1 - NaC22118 | 35 | 3 | 3 | 0.25 | 1.77 | 24.70 |
| F2 - NaC22118 | 35 | 3 | 0 | 0.5 | 1.67 | 34.49 |
| F3 - NaC22118 | 35 | 3 | 1.5 | 0.5 | 1.84 | 26.61 |
| F4 - NaC22118 | 35 | 3 | 0 | 0.25 | 1.80 | 31.22 |
| F5 - NaC22118 | 35 | 3 | 1.5 | 0 | 1.79 | 30.83 |
| F6 - NaC22118 | 35 | 3 | 3 | 0 | 1.83 | 28.84 |

Example 5

Milk protein formulas containing calcium caseinate (CaC) in combination with cellulose (0-3%) and/or xanthan gum (0-0.5%), which were used to enhance filament resistance and elasticity, were tested. Table 5 shows the diameter and tensile strength of filaments from this experiment. The F5-CaC30118 formulation was the most processable of all tested formulations and produced stronger filaments in comparison to the other five formulations.

TABLE 5

| Sample Description | Calcium Caseinate (%) | Cellulose (%) | Xanthan Gum (%) | Diameter (mm) | Tensile Strength (N/mm$^2$) |
|---|---|---|---|---|---|
| F1 - CaC30118 | 35 | 3 | 0.2 | 1.53 | 31.84 |
| F2 - CaC30118 | 35 | 1.5 | 0 | 1.6 | 36.11 |
| F3 - CaC30118 | 35 | 0 | 0.4 | 1.64 | 37.98 |
| F4 - CaC30118 | 35 | 3 | 0 | 1.87 | 27.51 |
| F5 - CaC30118 | 35 | 0 | 0.2 | 1.55 | 48.49 |
| F6 - CaC30118 | 35 | 1.5 | 0.4 | 1.56 | 37.62 |

Example 6

Milk protein formulas containing milk protein concentrate (MPC) and sodium caseinate (NaC) were evaluated to determine the effect of calcium chloride crosslinking on processability and mechanical properties of filaments. The extrusion process used in Examples 1-5 was repeated except calcium chloride was incorporated in the formulations at dry weight concentration of 0 to 2%. Table 6 shows that the addition of calcium chloride to the formulations improves processability, resilience, and durability of filaments.

TABLE 6

| Sample Description | MPC (%) | NaC (%) | SPI (%) | Calcium chloride (%) | Diameter (mm) | Tensile Strength (N/mm$^2$) |
|---|---|---|---|---|---|---|
| F4 - 40819 NaC | — | 36 | — | 2 | 0.98 | 37.05 |
| F2 - 50119 MPC | 36 | — | — | 2 | 1.08 | 34.07 |
| F2 - 102219 NaC—-SPI | — | 31 | 5 | 2 | 1.03 | 10.82 |
| F4 - 50119 NaC | — | 36 | — | 2 | 0.78 | 22.53 |
| F2 - 40819 MPC | 36 | — | — | 2 | 0.88 | 44.6 |
| F1 - 40819 MPC | 38 | — | — | 0 | 0.92 | 67.67 |

Example 7

Figure 8:
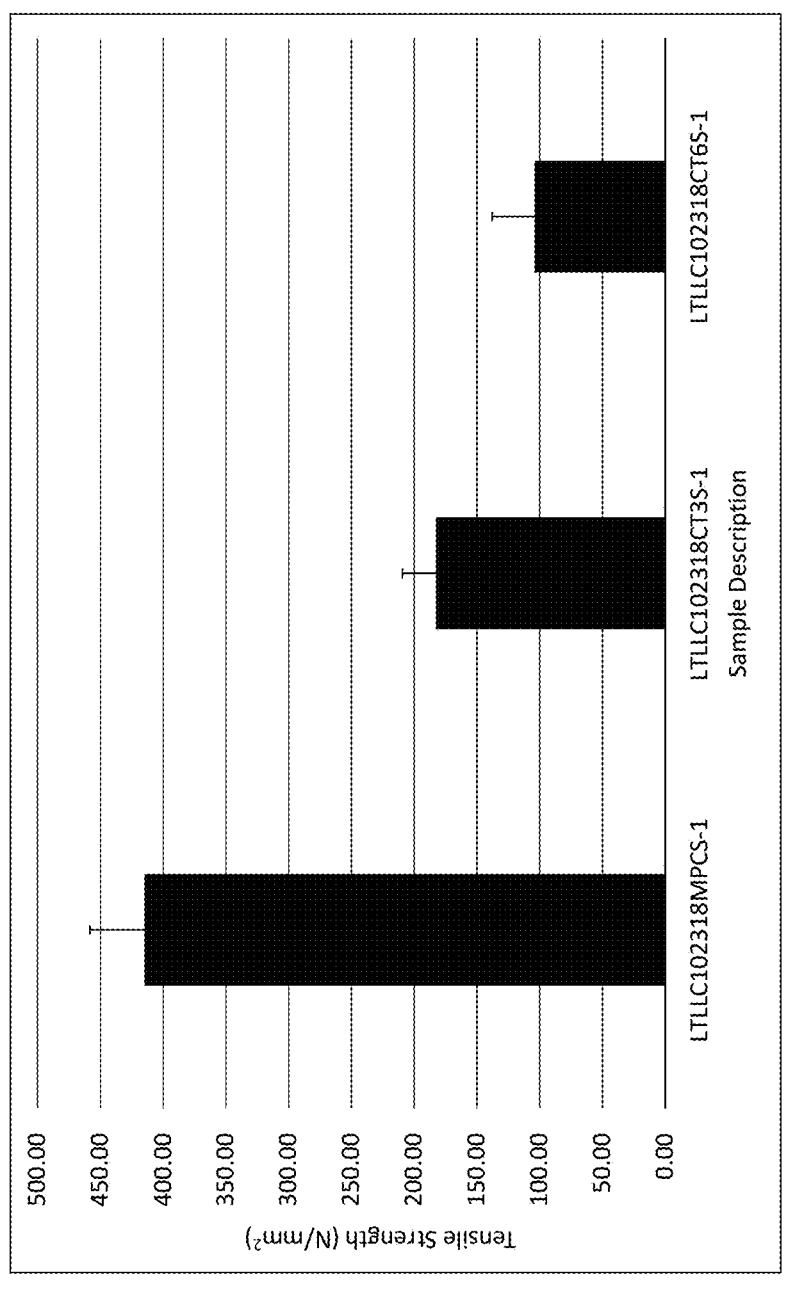
FIG. 8 is a bar chart showing the tensile strength ($N/mm^2$) of an extruded sheet of a milk protein concentrate (MPC)-based composition of the present invention, which is significantly improved, i.e., at least 2 times, in comparison to the tensile strength of extruded sheets of starch-based compositions.

Referring specifically now to FIG. 8, the tensile strength of a milk protein concentrate (MPC) containing sheet of the present invention was compared to two starch-based formulations. The three formulations, namely, the MPC composition of the present invention, the CT3 Matrix, and the CT6 Matrix (see Table 7a below), were used to create test sample sheets. Specifically, a sample sheet made using MPC as the source of caseinate was compared with sample sheets made from the CT3 Matrix and the CT6 Matrix, at the same water activity (Aw) and thickness. The filament forming composition comprised MPC as the source of caseinate plus other ingredients (see Tables 7a and 7b below). The MPC filament formulation underwent 50 mm TSE extrusion at a 50:50 solid to liquid ratio, through a 30-inch sheeting die head, where the gap width was set at a 0.5 mm. The tensile strength of sheets formed in this process were compared with extruded sample sheets made from starch-based filament compositions of the CT3 Matrix and the CT6 Matrix. To conduct a proper comparison, the same process used to make the sheet of the MPC composition was also used to make sheets from the CT3 Matrix and the CT6 Matrix formulations. The filament forming compositions for the CT3 Matrix and the CT6 Matrix comprised modified potato starch plus other ingredients (see Tables 7a and 7b below below). The CT3 Matrix filament formulation underwent 50 mm TSE extrusion at a 68:32 solid to liquid ratio, and the CT6 Matrix filament formulation underwent 50 mm TSE extrusion at a 70:30 solid to liquid ratio. Both CT3 and CT6 Matrices formulations were extruded using a 30-inch sheeting die head at minimum of 100 lb/hr, and the melt temperature reached at least 195° Fahrenheit (see Table 7b below).

The resulting sample sheets were evaluated for quality and textural attributes including sheet thickness, flowability, stickiness, etc. A maximum rate of 188 lb/hr. was utilized for processing the MPC composition, the CT3 Matrix, and the CT6 Matrix compositions. The tensile strengths of the sheets made from the MPC composition, the CT3 Matrix composition, and the CT6 Matrix composition are represented in FIG. 8, which shows that the sheet made using the MPC-based formulation was more than 2 times stronger than either sample sheets made from starch-based formulations of the CT3 Matrix and CT6 Matrix compositions.

TABLE 7a

| Tested Formulations | | | |
|---|---|---|---|
| Materials | MPC (%) | CT3 (%) | CT6 (%) |
| Solids Preblend | 37.7 | 73.57 | 72.12 |
| Glycerin USP | 8 | 18.36 | 18.36 |
| Tap Water | 54.1 | 7.22 | 8.67 |
| K Sorbate | 0.2 | 0.65 | 0.65 |
| Antioxidant Naturox Premium, Liq. | 0 | 0.05 | 0.05 |
| Rotisserie Chicken Flavor | 0 | 0.15 | 0.15 |

TABLE 7b

| Processing Parameters | | |
|---|---|---|
| | Solid (%) | Liquid Feed |
| Matrix Formula Feed rates (solid:liquid) | | |
| Orig. formula (CT3) | 73.57 | 26.43 |
| Actual | 70 | 30 |
| Orig. formula (CT6) | 72.12 | 27.88 |
| Actual | 70 | 30 |
| MPC Formula Feed rates (solid:liquid) | | |
| | 50 | 50 |

Example 8

Surface energy is an indicator of composition of a polymer surface. Surface properties of filaments demonstrate important characteristics such as hydrophilicity, hydrophobicity, electrostatic properties, and/or binding potential to other matrices. Lack of useful surface properties may lead to surface treatment to introduction of new functional groups, increase surface energy or wettability, increase hydrophobicity or hydrophilicity, improve chemical inertness, and/or introduce surface cross-linking.

Thirty-two filament samples, produced as described in preceding examples, were tested for surface energy in polar and dispersive components. Triplicate experiments were performed with each of the two probe liquids on each filament. Contact angles with these probe liquids were measured by the dynamic contact angle method (Wilhelmy).

Surface polarity of filaments and associated mechanical properties are shown in Table 8.

TABLE 8

Mechanical and Surface Properties of Filaments

| Filament Sample Code | Elastic Modulus (N/sec) | Tensile Strength (N/mm2) | Diameter (mm) | Surface Polarity (%) |
|---|---|---|---|---|
| 081319F3 NaC | 1.09 | 17.98 | 0.48 | 25.47 |
| 081319F3 NaC | 1.41 | 13.71 | 0.76 | 25.55 |
| 100119F1 NaC | 2.67 | 30.26 | 0.84 | 24.72 |
| 100919F1 NaC | 2.17 | 13.84 | 0.98 | 24.25 |
| 090919F1 NaC | 1.98 | 12.86 | 0.9 | 23.77 |
| 040819F3 NaC | 4.45 | 40.78 | 0.95 | 23.26 |
| 040819F4 XL–NaC* | 3.38 | 37.05 | 0.98 | 22.73 |
| 050119F2 XL–MPC | 4.83 | 34.07 | 1.08 | 22.18 |
| 102219F2 XL–NaC-SPI | 1.09 | 10.82 | 1.03 | 22.04 |
| 102219F1 XL–NaC | 1.57 | 12.22 | 1.54 | 21.41 |
| 102219F1 XL–NaC | 2.77 | 13.57 | 1.2 | 20.02 |
| 090919F2 NaC-SPI | 1.82 | 12.04 | 1.09 | 20.01 |
| 090919F3 NaC-SPI | 2.31 | 11.39 | 1.21 | 19.88 |
| 090919F4 NaC-SPI | 2.03 | 11.76 | 1.14 | 19.32 |
| 081319F4 - 265F NaC-SPI | 3.03 | 19.66 | 1.05 | 18.66 |
| 100919F2-NaC-SPI | 1.92 | 18.66 | 0.88 | 18.35 |
| 081319F4 - 245F NaC-SPI | 2.17 | 14.49 | 1 | 18.11 |
| 100919F3 NaC-SPI | 1.76 | 15.07 | 0.98 | 17.21 |
| 100919F4 NaC-SPI | 2.13 | 17.49 | 0.98 | 16.87 |
| 081319F4 NaC-SPI | 1.06 | 17.36 | 0.71 | 16.09 |
| 100119F2 NaC-SPI | 1.83 | 29.26 | 0.74 | 15.29 |
| 102219F2 XL–NaC-SPI | 2.92 | 15.92 | 1.3 | 14.47 |
| 102219F3 XL–NaC-SPI | 2.82 | 12.23 | 1.25 | 13.62 |
| 102219F4 XL–NaC-SPI | 3.5 | 14.94 | 1.33 | 12.76 |
| 050119F4 XL–NaC | 4.26 | 22.53 | 0.78 | 11.88 |
| 100119F4 NaC-SPI | 2.12 | 14.82 | 1.23 | 10.98 |
| 100119F3 NaC-SPI | 1.91 | 17.34 | 0.84 | 10.08 |
| 081319F1 MPC | 1.72 | 8.31 | 1.2 | 9.38 |
| 040819F2 XL–MPC | 3.75 | 44.6 | 0.88 | 8.06 |
| 040819F1 MPC | 4.5 | 67.67 | 0.92 | 7.34 |

Surface polarity is in the following order: NaC>NaC-SPI>NaC-SPI-XL>MPC.

Milk protein concentrate (MPC), sodium caseinate (NaC), and calcium caseinate (CaC) were all shown to be effective sources of caseinate for use in compositions to produce filaments and sheets of the present invention. Specifically, filaments having diameters from about 0.3 mm to 1 mm and resulting tensile strengths of from about 30 MPa to 80 MPa, and sheets from about 0.5-1.0 mm thick and resulting tensile strengths of from about 30 MPa to 80 MPa, were produced. These materials exhibited suitable flowability during processing. Interestingly, MPC-based compositions exhibited lower stickiness when extruded and resulted in superior downstream handling compared to other sources of caseinate, and the MPC-based compositions produced overall stronger filaments.

Although the invention has been described with reference to specific embodiments, these embodiments are illustrative only and not limiting. Many other applications and embodiments of the invention will be apparent in light of the disclosure and the following claims. Accordingly, it is intended that the invention embraces all such alternatives, modifications, and variations as falling within the scope of the claims below.

The invention claimed is:

1. A composition for forming a flexible and high tensile strength filament, the composition comprising:

(a) from 30 wt. % to 60 wt. % of at least one casein-based protein;

(b) from 40 wt. % to 65 wt. % of a plasticizer; and (c) from 0.1 wt % to 0.35 wt % of a hydrocolloid;

wherein the weight-to-weight ratio of the hydrocolloid to the casein-based protein is from 1:85 to 1:600;

wherein the casein-based protein is selected from the group consisting of milk protein concentrate, calcium caseinate, and sodium caseinate; and wherein the composition can be formed into the filament having a diameter of from 80 microns to 2,000 microns and a tensile strength of from 30 MPa to 80 MPa.

2. The composition of claim 1, wherein the casein-based protein comprises intact casein micelles.

3. The composition of claim 1, wherein the plasticizer comprises water, glycerol, lactose, or mixtures thereof.

4. The composition of claim 1, wherein the composition further comprises one or more crosslinkers.

5. The composition of claim 4, wherein the one or more crosslinkers comprises a divalent ion.

6. The composition of claim 5, wherein the divalent ion is a calcium ion.

7. The composition of claim 1, wherein the composition further comprises at least one additional ingredient.

8. The composition of claim 7, wherein the at least one additional ingredient is selected from the group consisting of proteins other than casein-based proteins, polysaccharides, and mixtures thereof.

9. The composition of claim 8, wherein the proteins other than casein-based proteins are gelatin or soy protein isolate or mixtures thereof.

10. The composition of claim 8, wherein the polysaccharide is cellulose.

11. The composition of claim 1, wherein the hydrocolloid is xanthan gum.

12. A flexible and high tensile strength filament having a diameter of from 80 microns to 2,000 microns and tensile strength of from 30 MPa to 80 MPa, the filament made by (a) forming a composition comprising:

from 30 wt. % to 60 wt. % of a casein-based protein selected from the group consisting of milk protein concentrate, calcium caseinate, and sodium caseinate, from 40 wt. % to 65 wt. % of a plasticizer; and from 0.1 wt % to 0.35 wt % of a hydrocolloid, wherein the weight-to-weight ratio of the hydrocolloid to the casein-based protein is from 1:85 to 1:600;

(b) extruding the composition through a twin-screw extruder fixed with a 5-hole, 2.3 mm die head, wherein the extruder operates at a melt pressure of from 350 psi to 600 psi and a temperature of from 175° Fahrenheit to 210° Fahrenheit; and (c) depositing the extruded composition onto a conveyer, wherein the conveyer operates at a speed from 42 feet per minute to 80 feet per minute to draw down the filament to a diameter of from 80 microns to 2,000 microns and thereby form the flexible and high tensile strength filament.

13. A flexible and high tensile strength filament having a diameter of from 80 microns to 1,000 microns and tensile strength of from 30 MPa to 80 MPa, the filament made by (a) forming a composition comprising:

from 30 wt. % to 60 wt. % of a casein-based protein selected from the group consisting of milk protein concentrate, calcium caseinate, and sodium caseinate, from 40 wt. % to 65 wt. % of a plasticizer; and from 0.1 wt % to 0.35 wt % of a hydrocolloid, wherein the weight-to-weight ratio of the hydrocolloid to the casein-based protein is from 1:85 to 1:600;

(b) extruding the composition through a twin-screw extruder fixed with an 8-hole, 1.4 mm die head, wherein the extruder operates at a melt pressure of from 100 psi to 180 psi and a temperature of from 150° Fahrenheit to 200° Fahrenheit; and (c) depositing the extruded composition onto a conveyer, wherein the conveyer operates at a speed from 42 feet per minute to 80 feet per minute to draw down the filament to a diameter of from 80 microns to 1,000 microns and thereby form the flexible and high tensile strength filament.

14. A thread comprising at least one filament formed from the composition of claim 12.

15. A strand comprising at least one filament formed from the composition of claim 12.

16. A long-lasting pet chew comprising more than one filament formed from the composition of claim 12.

* * * * *